(12) United States Patent
Kadle et al.

(10) Patent No.: US 7,533,535 B2
(45) Date of Patent: May 19, 2009

(54) THERMALLY CONDITIONED CONTAINER FOR A VEHICLE

(75) Inventors: Prasad Shripad Kadle, East Amherst, NY (US); Edward Wolfe, IV, Amherst, NY (US); Joseph Pierre Heremans, Troy, MI (US); Donald T. Morelli, White Lake, MI (US)

(73) Assignee: Delphi Technologies, Inc, Troy, MI (US)

( * ) Notice: Subject to any disclaimer, the term of this patent is extended or adjusted under 35 U.S.C. 154(b) by 633 days.

(21) Appl. No.: 11/148,756

(22) Filed: Jun. 9, 2005

(65) Prior Publication Data

US 2005/0257531 A1 Nov. 24, 2005

Related U.S. Application Data

(63) Continuation-in-part of application No. 10/948,348, filed on Sep. 23, 2004, now Pat. No. 7,238,101.

(60) Provisional application No. 60/572,691, filed on May 20, 2004, provisional application No. 60/577,624, filed on Jun. 7, 2004.

(51) Int. Cl.
*F25B 21/02* (2006.01)

(52) U.S. Cl. ............................. 62/3.3; 62/3.61

(58) Field of Classification Search ............... 62/3.3, 62/239, 272, 93, 3.2, 3.4, 3.61, 3.7, 90, 92, 62/160, 238.7, 324.1, 159, 244; 165/42, 165/43, 61; 454/69, 160, 907

See application file for complete search history.

(56) References Cited

U.S. PATENT DOCUMENTS

| 2,902,838 | A | * | 9/1959 | Nichols | 62/244 |
| 4,759,190 | A | | 7/1988 | Trachtenberg | 62/3 |
| 5,924,766 | A | | 7/1999 | Esaki | 297/180.13 |
| 6,079,485 | A | * | 6/2000 | Esaki et al. | 165/43 |
| 6,119,463 | A | | 9/2000 | Bell | 62/3.7 |
| RE38,128 | E | | 6/2003 | Gallup et al. | 62/3.5 |

FOREIGN PATENT DOCUMENTS

| WO | WO99/58907 | 11/1999 |
| WO | 0130606 A | 3/2001 |

OTHER PUBLICATIONS

EP 05 07 6080, European Search Report dated Apr. 24, 2006.

* cited by examiner

*Primary Examiner*—Mohammad M Ali
(74) *Attorney, Agent, or Firm*—Patrick M Griffin

(57) ABSTRACT

A thermo-electric device is disposed in series with the HVAC module for heating and cooling air $T_a$ from the HVAC module for delivery to seat passages of a seat assembly and/or to a thermal container. The thermoelectric device includes a thermoelectric module, a heat exchanger having cold and hot sides, ductwork, a divider that sends variable air flow to the cold or hot sides of the thermoelectric module, and thermal insulation between the cold and hot sides downstream of the heat exchanger. The fan of the HVAC module is the sole motivation for moving the conditioned air $T_a$ originating from the central HVAC module through the thermoelectric device and to the seat assembly and/or to a thermal container.

4 Claims, 4 Drawing Sheets

THERMALLY CONDITIONED CONTAINER FOR A VEHICLE

RELATED APPLICATIONS

This application is a continuation-in-part of application Ser. No. 10/948,348 filed Sep. 23, 2004, now U.S. Pat No. 7,238,101 which, in turn, claims the benefit of provisional application 60/572,691 filed May 20, 2004 and 60/577,624 filed Jun. 7, 2004.

BACKGROUND OF THE INVENTION

1. Field of the Invention

The subject invention relates to a thermally air conditioned container in an automotive vehicle by using air from the HVAC system of the vehicle.

2. Description of the Prior Art

The thermal conditioning of beverages, or medicine in a vehicle is conventionally provided by the central heating, ventilation and air conditioning (HVAC) module of the vehicle or a separate thermoelectric device. In the case of cooling with the HVAC system, it takes time for the typical Rankin cycle to cool air. In the case of heating with the HVAC system, it takes time to warm the coolant due to thermal inertia of the engine and the HVAC ductwork to warm-up. On the other hand, a thermoelectric device to heat or cool the air does not have the thermal capacity vs. power draw to perform the task, particularly in the short time demanded by the user. Such a device is shown in U.S. Pat. No. 4,759,190 to Trachtenberg et al.

The same problems are presented in the cooling and heating of a passenger in an automotive vehicle. The current automotive air conditioning systems utilize ducts at the floor to heat, and ducts leading to vents in the instrument panel to cool. The effectiveness in attempting to cool or heat occupants in an automobile is significantly lost to the surrounding air and thermal mass, as only part of the heat exchange is directed toward the passenger.

SUMMARY OF THE INVENTION AND ADVANTAGES

The subject invention provides thermally conditioned air to a thermal container in an automotive vehicle having a HVAC module for supplying heating and cooling air to a cabin vent and is distinguished by exchanging heat with the heating and cooling air from the HVAC module in an auxiliary heat exchanger before delivery to the thermal container, i.e., by an auxiliary air-conditioning device in the ductwork between the HVAC module and the thermal container.

Therefore, the subject invention provides a thermoelectric device in series with thermally conditioned air from an HVAC module to provide the ultimate cooling or heating upon initial warm-up and cool down, and in steady state operation. The invention differs from the prior art by using preconditioned air from the HVAC module rather than cabin air for the hot and cold side of a thermoelectric device. The placement of the thermoelectric device in series with the HVAC increases the effectiveness in cooling or heating the thermal container and significantly reduces the initial time to reach the desired temperature in the compartment of the thermal container, i.e., a faster cool-down in the cooling mode and/or warm-up in the heating mode of the thermal container than would otherwise be obtained using unconditioned air flows.

Because the thermoelectric device operates using preconditioned HVAC module air, the temperature range, $-7°$ C.$-27°$ C., of operation is narrower than in known systems, $-15°$ C.$-40°$ C., in the first 2-10 minutes of operation and the average temperature of operation is shifted to a lower temperature (from $27.5°$ C. to $10°$ C.).

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
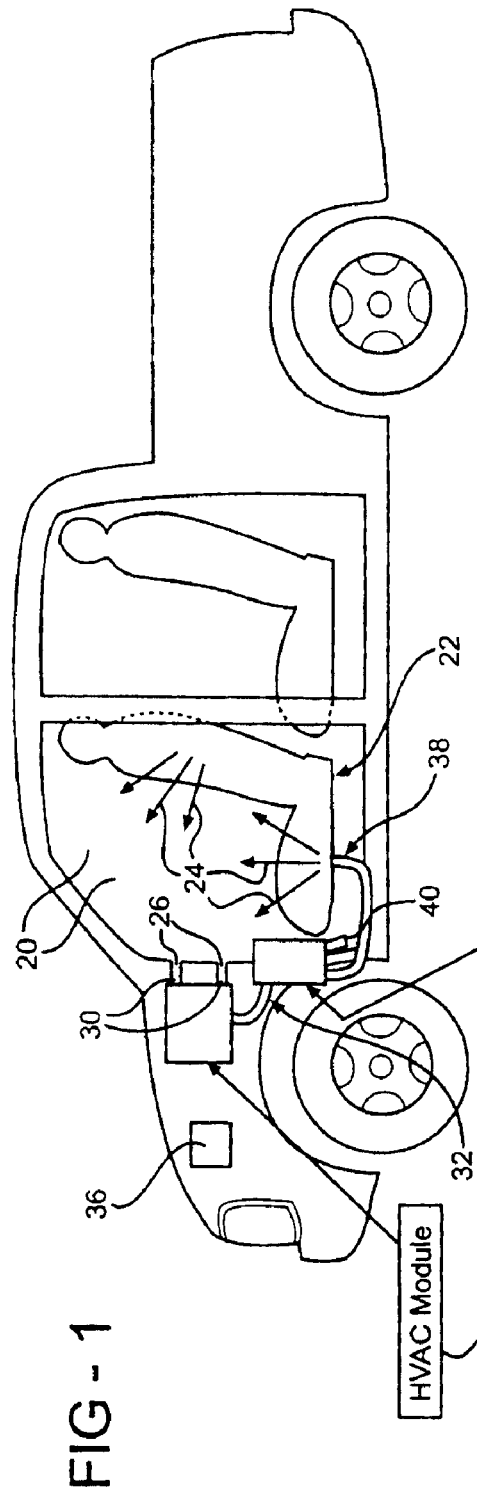
FIG. 1 is a schematic view of an automotive vehicle combined with the auxiliary air-conditioning device for thermally conditioning a seat assembly in the vehicle.
Figure 2:
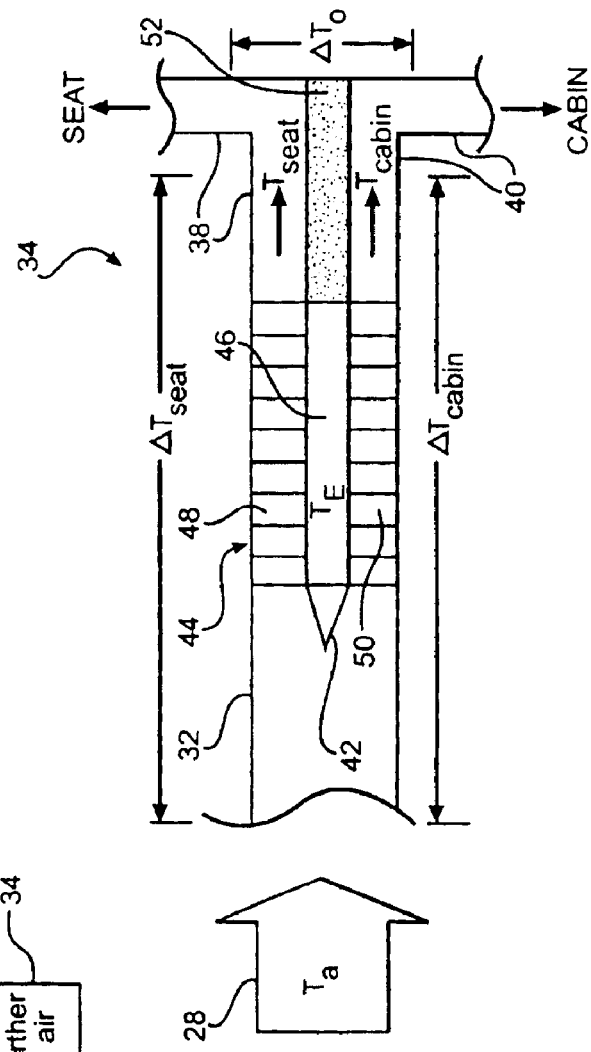
FIG. 2 is a schematic view of the auxiliary air-conditioning device.

Referring to the Figures, an automotive vehicle is illustrated in FIG. 1 and an auxiliary air-conditioning device is illustrated in FIG. 2.

The automotive vehicle includes a body defining a passenger cabin 20. A seat assembly 22 is disposed in the passenger cabin 20 and has seat passages 24 for thermally conditioning a seat occupant with air, e.g., the vehicle seat assembly 22 may have a perforated seat cushion that will allow air to pass through.

The passenger cabin 20 has at least one and normally a plurality of cabin vents 26 in the vehicle for conveying air into the passenger cabin 20. A well known HVAC module 28 supplies heating and cooling air and cabin ductwork 30 conveys the heating and cooling air from the HVAC module 28 to the cabin vent 26 and seat ductwork 32 conveys the heating and cooling air from the HVAC module 28 to the seat passages 24 of the seat assembly 22.

An auxiliary air-conditioning device comprising a thermoelectric device 34 is disposed in the seat ductwork 32 for heating and cooling air from the HVAC module 28 for delivery to the seat passages 24 of the seat assembly 22. The vehicle includes an electrical system 36 including a battery and an alternator for supplying electrical power and the thermoelectric device 34 is connected electrically to the electrical system 36 for receiving electrical power there from. The thermo-electric device 34 includes a seat side 38 and a cabin side 40 that include a seat duct for conveying air from the seat side 38 to the seat passages 24 and a cabin duct for conveying air form the cabin side 40 to a cabin vent 26.

As alluded to above, the ductwork includes a HVAC duct for conveying air from the HVAC module 28 to the auxiliary air-conditioning device, and a flow divider 42, illustrated as a pointed wall, is disposed in the HVAC duct for dividing air between the seat side 38 and the cabin side 40 of the auxiliary air-conditioning device from the HVAC module 28. The wall divides air from the HVAC module 28 for passing through the seat side 38 and the cabin side 40.

The auxiliary air-conditioning device includes a heat exchanger 44 disposed between the seat side 38 and cabin side 40 for transferring heat therebetween. More specifically, the heat exchanger 44 includes a thermoelectric element 46 or module disposed between the seat side 38 and the cabin side 40 with a first heat exchanger 48 on the seat side 38 of the thermoelectric element 46, and a second heat exchanger 50 on the cabin side 40 of the thermoelectric element 46. A thermal insulation 52 is between the seat side 38 and the cabin downstream of the auxiliary air-conditioning device for inhibiting the transfer of thermal energy between the seat side 38 and the cabin side 40.

The auxiliary air-conditioning device may be supported by the seat assembly 22 for efficiency and response time, as discussed below, or mounted in vehicle close thereto via the seat duct being flexible for allowing relative movement between the said seat assembly 22 and the auxiliary air-conditioning device.

The air will be supplied from the HVAC module 28 after a mixing chamber to allow thermally conditioned dry air to enter a set of ductwork 30, 32. The supplied air will then enter the thermoelectric device placed as close as possible to the seat assembly 22, as alluded to above, preferably supported on the seat assembly 22. The placement of the thermal electric device as close as possible to the seat assembly 22 is important to the efficiency of the inventive combination and to minimize the empty or static air between the seat and thermoelectric heat device that would not be conditioned on initial startup of the vehicle.

The current invention supplies conditioned air to the seat assembly 22 at a low flow rate, typically around five to ten percent (5-10%) of the total airflow to each seat at high blower setting and diminishing to one to two percent (1%-2%) of total airflow to each seat at low blower setting. A typical airflow percentage for each seat is set forth in this table:

TABLE

Typical Seat Airflow Percentages
Percent of Total Airflow Directed Toward Seats

| Blower setting | Driver Seat Airflow | Passenger Seat Airflow |
|---|---|---|
| HI | 5%-10% | 5%-10% |
| M1 | 3.5%-7% | 3.5.%-7% |
| M2 | 1.5%-3% | 1.5.%-3% |
| LO | 1%-2% | 1%-2% |

However, conditioned air from an HVAC module 28 takes time to warm the air depending upon the temperature of the coolant or of the refrigerant. The initial warm-up and cool down can be accelerated as the thermoelectric device operates for the first few minutes, then the HVAC module 28 conditioned air is utilized to comfort the passenger. These modules and devices will work in combination to provide the optimal cooling or heating with minimal electrical power consumption.

The thermoelectric subassembly or device shown in FIG. 2 to supply conditioned air to the heated and cooled seat assembly 22 includes a thermoelectric element 46, seat side 38 and cabin side 40 heat exchangers 44, the ductwork 30, 32, a flow divider 42 that sends air flow to the seat side 38 or the cabin side 40 of the thermoelectric element 46, and thermal insulation 52 downstream from the heat exchanger 44. The air $T_a$ originating from the central HVAC module 28 of the vehicle is propelled through the thermoelectric device by the fan built into the HVAC module 28, the fan of the HVAC module 28 being the sole motivation for moving the conditioned air $T_a$ to the seat assembly 22. A fraction $T_{seat}$ of the air $T_a$ from the HVAC module 28, determined by the flow divider 42, or other dividing device, serves to heat or cool the seat, the other fraction $T_{cabin}$ is used to manage the heat load imposed by the thermoelectric element 46 and is dumped into the passenger cabin 20. The seat side 38 and the cabin side 40 of the heat exchanger 44 utilize air flows originating from the main HVAC module 28 of the vehicle as opposed to air from the passenger cabin 20. By the use of the appropriate duct work and thermal insulation 52, a fraction $T_{seat}$ of the preconditioned air $T_a$ from the HVAC module 28 may be directed over the seat side 38 of the heat exchanger 44 and to the seat assembly 22, the remaining fraction $T_{cabin}$ being directed over the cold side of the heat exchanger 44 and to the passenger cabin 20; these fractions being fixed at an optimum value by the shape of the proportioning fixed flow divider 42.

Figure 8:
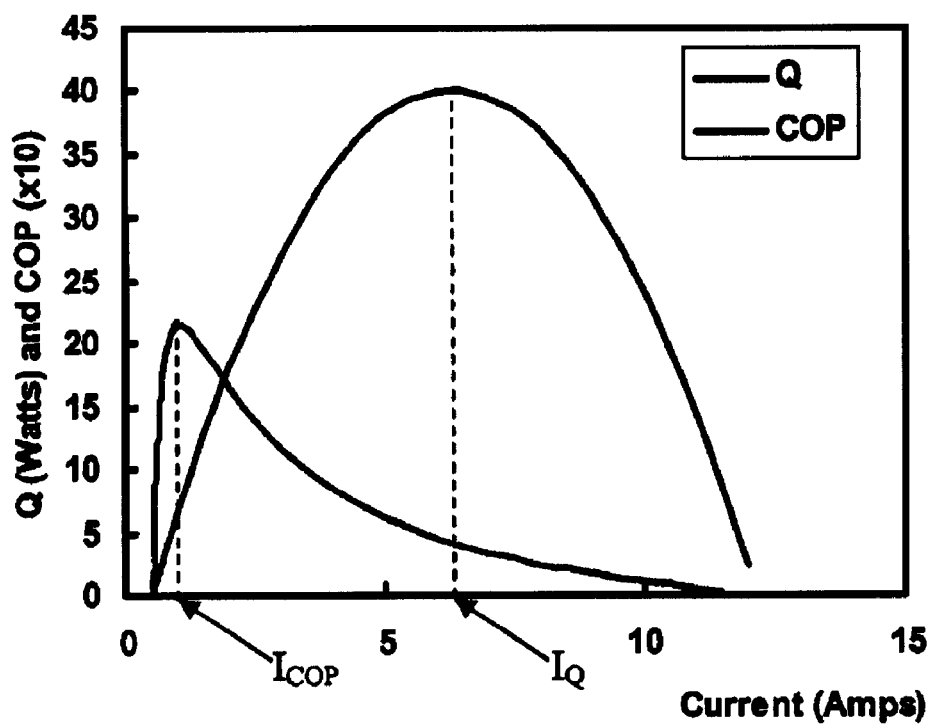

In operation, the HVAC module 28 directs pre-cooled (in cooling mode) or preheated (in heating mode) air ($T_a$) from the HVAC module 28 over the seat side 38 and cabin side 40 of the Thermoelectric (TE) device. This TE device, driven by an electrical current I, causes further cooling or heating of the air on the cold side of the TE device, and the heat absorbed from the cold side is pumped to and liberated from the hot side via the hot side of the heat exchanger 44. Two important parameters of a TE device are the cooling power Q and the coefficient of performance (or refrigerating efficiency) COP. The efficiency of any cooling system, be it a vapor-compression system or a thermoelectric system, is defined as the Coefficient of Performance (COP), which is, by definition, the amount of heat extracted on the cold side divided by the work (electric energy) required, W: COPC=$Q_C$/W. Cooling power, Q, and coefficient of performance, COP, are a function of the current (I) in the TE device and the seat side 38 and the cabin side 40 temperatures $T_{seat}$ and $T_{cabin}$, respectively. When the auxiliary air conditioning device is in the cooling mode, $T_c$=$T_{seat}$ and $T_h$=$T_{cabin}$ and the expressions for COP and Q can be expressed as the following:

$$Q = SIT_C - K\Delta T - \frac{1}{2}I^2R \text{ and} \quad (1)$$

$$COP = \frac{SIT_C - K\Delta T - \frac{1}{2}I^2R}{I(S\Delta T + IR)} \quad (2)$$

where S is the thermoelectric power of the module (in units of V/K), K is the module thermal conductance (in W/K), and R is the module resistance (in ohms); $\Delta T$=$T_H$–$T_C$. For example, for Tavg=° C.=(½)(Th+Tc), typical values for the thermoelectric parameters (see for instance www.ferrotec.com) are S=0.053 V/K, K=0.51 W/K, and R=2.4 ohm. The resulting dependencies of Q and COP on I are shown in FIG. 8.

Conventional TE devices are operated such that either the COP, or the cooling power Q is maximized. When optimized for COP, the TE device is driven at current $I_{COP}$. This results, however, in a very low cooling power. If operated over a short period of time, however, the device may be operated at the current $I_Q$ that maximizes the cooling power. Although this higher pumping capacity takes place at a lower COP, the TE device is operated at this current for only a short period of time. After a predetermined time period, the air $T_a$ originating from the vehicle HVAC module 28 has cooled sufficiently that the current I of the TE device may be turned down to $I_{COP}$ to maximize its cooling efficiency.

The main advantage of the series HVAC module 28 and thermoelectric device for seat cooling is that the steady-state cooling can be handled mostly by the HVAC module 28, so that the thermoelectric device can be optimized mainly for maximum cooling power. When operated in this scenario the seat climate control system has an improved transient response relative to a similar system that uses air originating from the passenger cabin 20 for heat exchange.

In the operation of the climate control system, the TE device is operated initially at a current that maximizes cooling or heating capacity and then, after a predetermined time period, it is operated at a lower current level, thereby improving the transient heating/cooling of the seat relative to a climate control system using cabin air as the heat exchange medium.

The thermoelectric device can be designed for cooling power, as opposed to COP. It is known in the art that thermoelectric devices are optimum for COP when they a have a high "thermoelectric figure of merit", Z, defined as:

$$Z = S^2/\rho\kappa$$

where S is the Seebeck coefficient, $\rho$ is the electrical resistivity and $\kappa$ the thermal conductivity. To design a thermoelectric device for maximum cooling power, set the derivative of equation above with respect to current equal to zero, solve for current I, and then substitute that current into the same equation to obtain the maximum cooling power, resulting in:

$$Q_{max} = \frac{S^2 T_C^2}{2R} - K\Delta T. \quad (4)$$

Considering this equation, the optimum thermoelectric device has a high Seebeck coefficient and a low electrical resistance, a property that is dependent on geometry. The optimum is now also relatively independent of thermal conductance during the transient, as, by definition, the temperature gradient starts at zero and remains relatively small (<° C.) during the entire duration of the transient. The geometry of the thermoelectric device can be optimized for this typical application.

In the alternative embodiments of FIGS. 3-7, the automotive vehicle also includes a thermal container 54 defining a compartment disposed in the passenger cabin 20 for thermally conditioning articles in the compartment of the thermal container 54 with air. The compartment of the thermal container 54 would actually include a cooler chamber and a heater chamber whereby articles to be cooled, such as beverages, could be placed in the cooler chamber and articles to be kept warm, such as sandwiches or coffee, could be kept in the heater chamber.

Again, the ductwork conveys the heating and cooling air from the HVAC module 28 to the cabin vent 26 and to the thermal container 54. In this embodiment, the thermo-electric device 34 heats and cools air from the HVAC module 28 for delivery to the compartment of the thermal container 54. However, the ductwork includes at least one thermal conduit 56 for conveying air from the thermo-electric device 34 to the seat passages 24 of the seat assembly 22 and to the thermal container 54.

Figure 3:
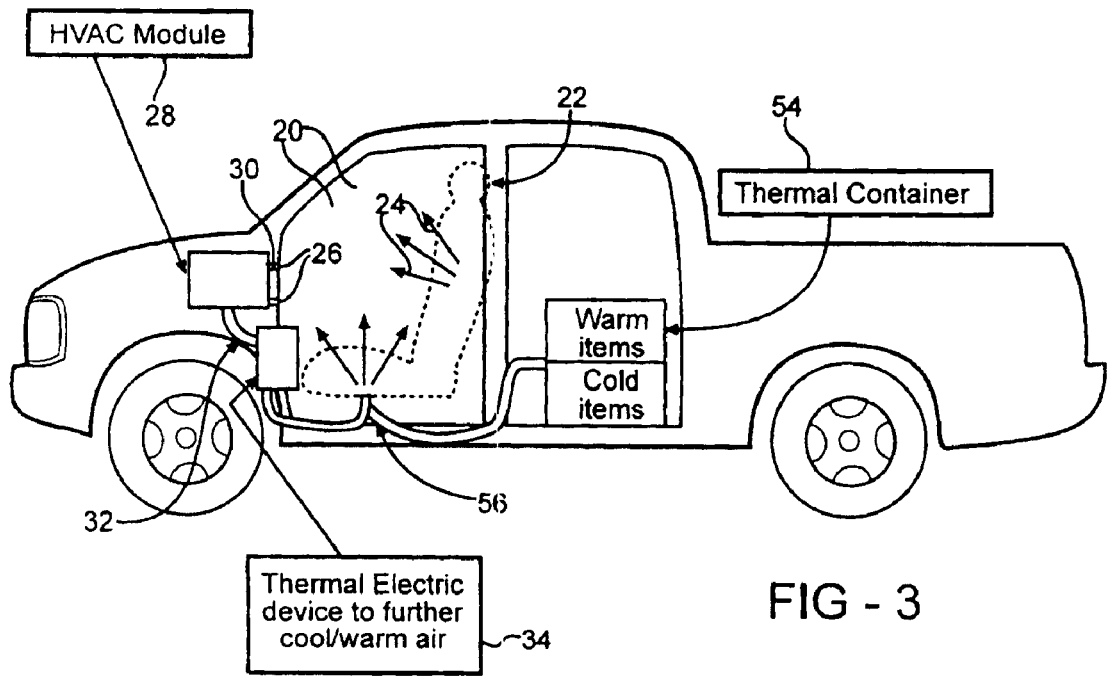
FIG. 3 is a schematic view of an automotive vehicle combined with the auxiliary air-conditioning device for thermally conditioning a seat assembly in series with a thermal container.
Figure 4:
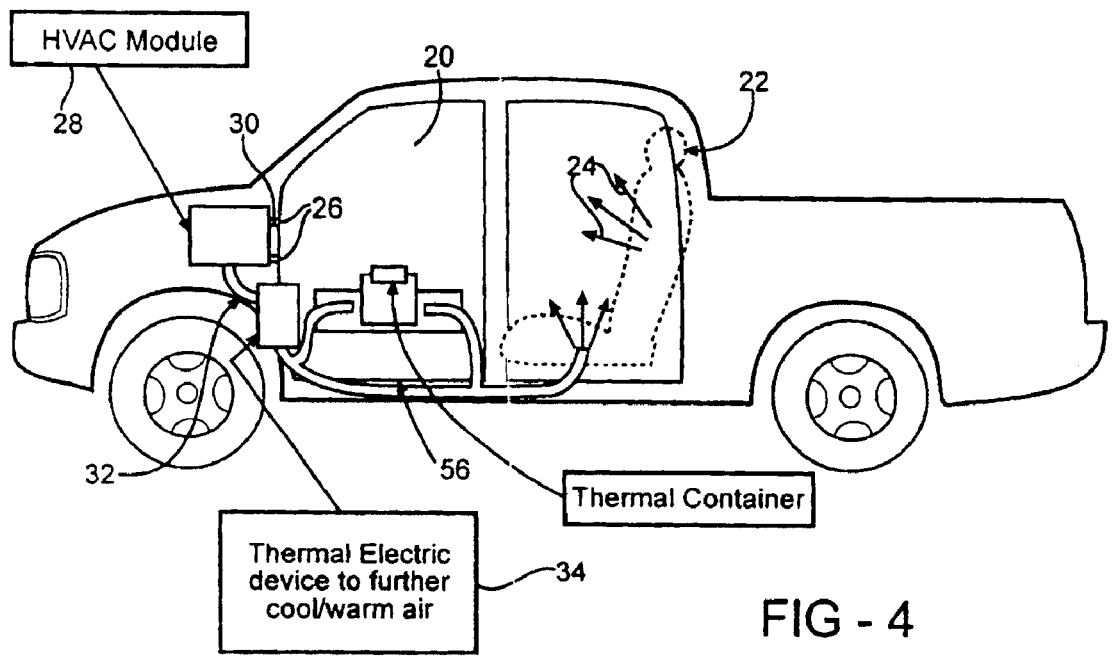
FIG. 4 is a schematic view of an automotive vehicle combined with the auxiliary air-conditioning device for thermally conditioning a seat assembly in parallel with a thermal container.

In the version illustrated in FIG. 3, the thermal conduit 56 places the seat passages 24 and the thermal container 54 in series with the thermo-electric device 34. In the version of FIG. 4, the thermal conduit 56 places the seat passages 24 and the thermal container 54 in parallel downstream of the thermo-electric device 34, i.e., the thermal container 54 is in parallel with the duct leading from the thermo-electric device 34 to the seat assembly 22.

Figure 6:
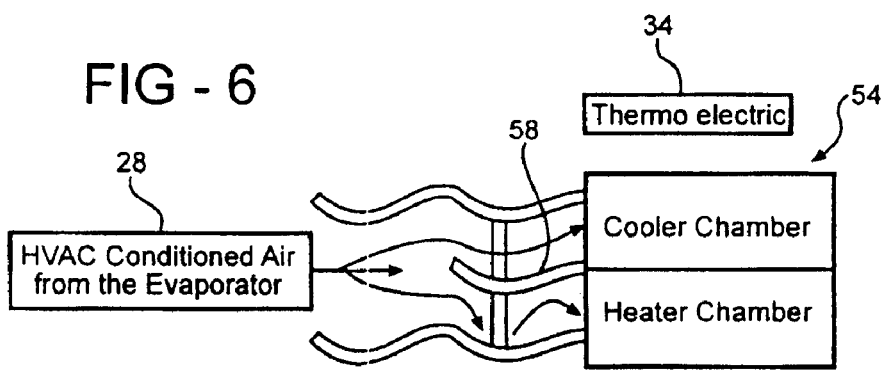
FIG. 6 is a schematic view of the air flow directly from the evaporator of the HVAC module to the thermal container.

As is well known, the HVAC module 28 includes an evaporator and in the specific version illustrated in FIG. 6, an evaporator conduit 58 for directing air from the evaporator to the thermo-electric device 34.

As will be appreciated, the scheme may be utilized for heating and cooling a variety of comfort devices in addition to the seat assemblies 22 and/or thermal containers 54 herein described.

The HVAC thermo-electric device 34, i.e., cooler/heater device, would utilize thermally conditioned airflow originating from the HVAC module. The thermally conditioned air from the HVAC module 28 would further be cooled or heated via the thermo-electric device 34 placed prior to the thermal container 54. The conditioned air would then flow through the thermal container 54 utilized with the heated air going to the warm items, and the cooled air going to the heated items. The thermal container 54 would rely on the cool or warm air to flow around the items to be conditioned. Thermo electric power and/or the HVAC module 28 temperature would be controlled to operate set the desired temperature for the warmer or heater.

Figure 5:
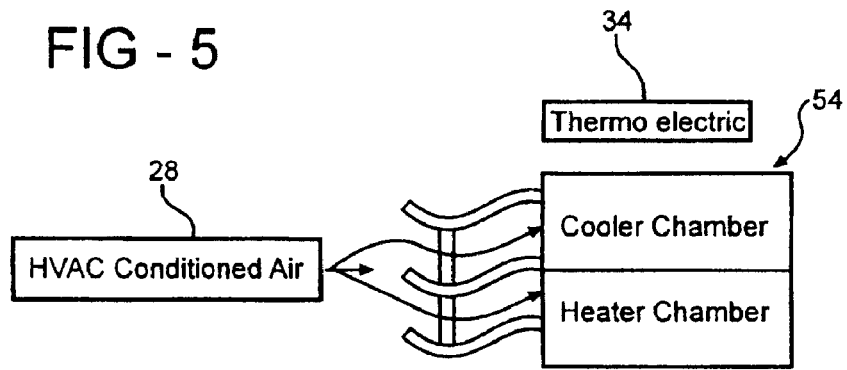
FIG. 5 is a schematic view of the air flow from the HVAC module to the thermal container.

The first design option is to utilize air from the HVAC module 28 after the temperature mixing valve as shown in FIG. 5. The system would then most efficiently work depending upon cabin requirements. The cold chamber would cool down rapidly in the summer time where cooling was required. The hot chamber would heat up quickly in the winter time where warm air would be required from the HVAC module 28. The added benefit is the thermo-electric device 34 in series with the HVAC module 28 could be used in combination with a seat assembly 22 and a thermal container 54, and other comfort devices.

A second design option is shown in FIG. 6, wherein the desired conditioned air from the HVAC module 28 is taken directly from the evaporator. The cool chamber would receive the air directly from the evaporator to the thermo-electric device 34 and then to the cooler chamber. The heating chamber would receive the air supplied directly from the evaporator and then to the hot side of the thermo-electric device 34.

Controllability is an integral part of the combination of the HVAC module 28 and thermo-electric device 34. As one chamber reaches the desired temperature, conditioned air will need to be bled off to allow the other chamber to reach its desired temperature. A control scheme to maintain the temperatures and airflow to each chamber are integral in maintaining the chamber specified temperature.

Figure 7:
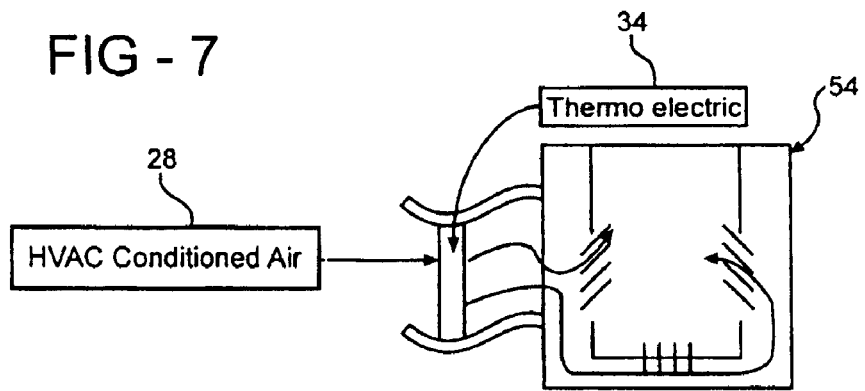
FIG. 7 is a schematic view of the air flow from the HVAC module to the interior of the thermal container.

The design option shown in FIG. 7 utilizes air from the HVAC module 28 after the temperature mixing valve. This design would provide conditioned air to the thermal container 54 based upon passenger comfort. For example, the design would optimally perform in the summer time to cool a beverage when cooling is selected by the operator. Additionally, the design would optimally perform to heat a beverage in the winter time when warm air would be selected from the HVAC module 28. The system could work in oppositely in the respective seasons (cooling in the winter time, and heating in the summer time), but not optimally. An important aspect is to control the flow of air to the thermal container 54 and that portion of the flow to the seat assembly 22. As the seat assembly 22 reaches the desired temperature, the flow could be deviated to the thermal container 54.

The benefit of the synergistic combination is utilizing both the heat transfer of the HVAC module 28 and the heat transfer of the thermo-electric device 34. The combined effect will maximize the rapid cool down or heat up of the items required. Of course, insulation could be added to help maintain temperatures and minimize energy consumption. The thermal container 54 could include a separate chamber of hot and cold, or use one chamber alternately for either hot or cold. In addition, the container could be reconfigurable to change relative size of hot and cold chambers, but maintain overall geometry. The compartment of the thermal container 54 could be expandable or be dividable into sub-chambers of different sizes. Of course, the system could be programmed to cycle on and off when the vehicle is not in use to maintain the desired temperature.

As will be appreciated, the invention provides a method of providing thermally conditioned air to passages in a seat assembly 22 of an automotive vehicle having a HVAC module 28 for supplying for supplying heating and cooling air to a cabin vent 26 wherein the method comprises the steps of delivering heating and cooling air from the HVAC module 28 to the seat passages 24 of the seat assembly 22 and/or to the thermal container 54, and exchanging heat with the heating and cooling air from the HVAC module 28 by an auxiliary heat exchange before delivery to the seat passages 24 of the seat assembly 22 and/or to a thermal container 54. As alluded to above, a specific step that can be implemented is the directing of air directly from the evaporator of the HVAC module 28 to the thermo-electric device 34.

The step of utilizing an auxiliary air-conditioning device is further defined as utilizing electrical power from the vehicle electrical system 36 to drive the auxiliary heat exchange.

The method is further defined as dividing the heating and cooling air from the HVAC module 28 into a seat side 38 and a cabin side 40 and the step of exchanging heat is further defined as exchanging heat between the seat side 38 and the cabin side 40. The method continues by conveying air from the seat side 38 to the seat passages 24 and conveying air from the cabin side 40 to the passenger cabin 20 via a cabin vent 26. The method further includes the step of dividing air from the HVAC module 28 between the seat side 38 and cabin side 40. The method also includes inhibiting the transfer of thermal energy between the air from the seat side 38 to the seat passages 24 and the air from the cabin side 40 to the cabin vent 26. The method is most efficient by conveying the heating and cooling air from the HVAC module 28 to the seat passages 24 solely by an air mover in the HVAC module 28. In other words, there is no air movement or propulsion device between the HVAC module 28 and the seat assembly 22.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An automotive vehicle comprising;
a body defining a passenger cabin,
a thermal container defining a compartment disposed in said passenger cabin and for thermally conditioning articles in said compartment with air,
at least one cabin vent in said vehicle for conveying the air into said passenger cabin, an HVAC module for supplying heating and cooling air,
ductwork for conveying said heating and cooling air from said HVAC module to said cabin vent and to said thermal container, an auxiliary air-conditioning device in said ductwork for heating and cooling the air from said HVAC module for delivery to said compartment of said thermal container, and a seat assembly disposed in said passenger cabin and having seat passages for thermally conditioning a seat occupant with the air, wherein said auxiliary air-conditioning device includes a seat side and a cabin side and a heat exchanger disposed between said seat side and cabin side for transferring heat therebetween, and said ductwork includes a seat duct for conveying the air from said seat side to said seat passages and a cabin duct for conveying air from said cabin side to said cabin vent.

2. An automotive vehicle comprising;
a body defining a passenger cabin,
a comfort device disposed in said passenger cabin and for thermally conditioning the comfort device with air,
at least one cabin vent in said vehicle for conveying air into said passenger cabin, an HVAC module for supplying heating and cooling air,
ductwork for conveying said heating and cooling air from said HVAC module to said cabin vent and to said comfort device,
an auxiliary air-conditioning device in said ductwork for heating and cooling the air from said HVAC module for delivery to said comfort device, and a seat assembly disposed in said passenger cabin and having seat passages for thermally conditioning a seat occupant with the air, wherein said auxiliary air-conditioning device includes a seat side and a cabin side and a heat exchanger disposed between said seat side and cabin side for transferring heat therebetween, and said ductwork includes a seat duct for conveying the air from said seat side to said seat passages and a cabin duct for conveying the air from said cabin side to said cabin vent.

3. An auxiliary air-conditioning device as set forth in claim 2 wherein said auxiliary air-conditioning device comprises a thermo-electric device for receiving electrical power from the electrical system of the vehicle.

4. An auxiliary air-conditioning device as set forth in claim 2 wherein said comfort device includes a thermal container.

* * * * *